Aug. 10, 1943.  H. J. LEIDEL  2,326,234
TIRE TOOL
Filed Jan. 29, 1941
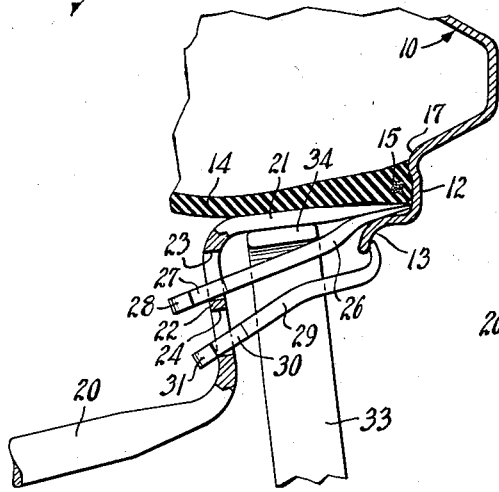
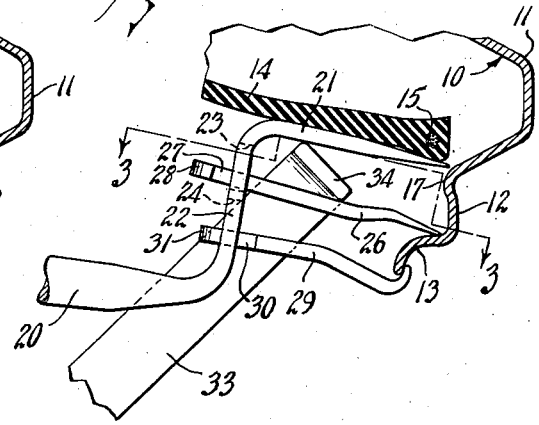
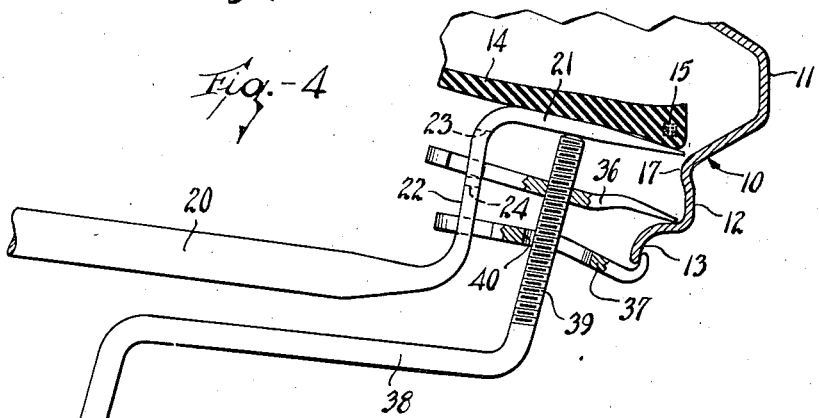
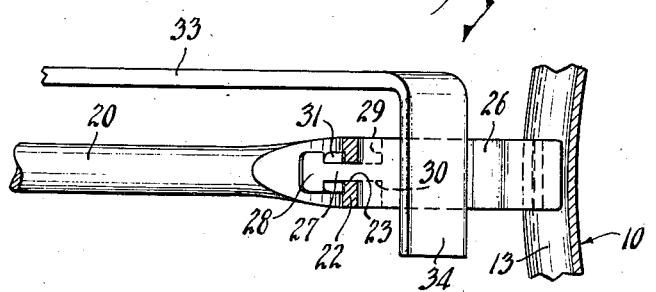
INVENTOR
HAROLD J. LEIDEL
ATTORNEY Patented Aug. 10, 1943

2,326,234

UNITED STATES PATENT OFFICE 2,326,234

TIRE TOOL

Harold J. Leidel, Wadsworth, Ohio

Application January 29, 1941, Serial No. 376,450

3 Claims. (Cl. 157—6)

This invention relates to tire tools such as are used to effect the removal of wheel casings from drop center tire rims, and more especially it relates to tire tools for the removal of tires from a new type of rim wherein the tire-beads are received in shallow circumferential channels or grooves in the rim. It will be understood, however, that the tool is not limited in its application to the particular wheel rim described, but that it may be advantageously used on other types of wheel rims.

The chief objects of the invention are to provide an improved tire tool of the character mentioned that will be simple in construction; that may be manufactured and sold at relatively low price; and which will be capable of exerting powerful leverage upon the bead portion of a wheel mounted upon a tire rim. Other objects will be manifest as the description proceeds.

Of the accompanying drawing:

Figure 1 is a fragmentary sectional view of a drop center rim of the type hereinbefore referred to, and a tire thereon, and the improved tire tool operatively associated with said tire and rim as it appears in the first phase of operation, a portion of said tool being broken away and in section;

Figure 2 is a section similar to Fig. 1 showing the tire tool in the final phase of moving the tire off the rim;

Figure 3 is a section on the line 3—3 of Fig. 2; and

Figure 4 is a view similar to Fig. 2 showing another embodiment of the invention in the course of moving a tire off a rim.

Referring to the drawing, there is shown a rim 10 of the type previously referred to, which rim is formed with the usual central circumferential well or depression 11 into which the beads of the tire are moved during the removal or demounting of the tire. The rim is formed with the usual tire or bead seats, such as the bead seat 12, and integral lateral flanges 13 on each of the latter. The tire is designated as a whole by the numeral 14, and includes the usual wire bead reinforcement 15 which is characteristic of straight-side tires. The reinforcements 15 render the tire beads substantially inextensible except by the application of a substantial force, which force is greater than that usually obtainable with ordinary tire tools.

Formed along the inner margin of each bead seat 12 is a low circumferential rib 17 which is a distinguishing characteristic of rims upon which the improved tire tool is designed to operate. The purpose of the rib 17 is to retain the tire casing in place after the tire is deflated so that a vehicle driver may bring the vehicle under control and to a safe stop in case of blow-out or puncture. The arrangement is such that each tire bead is positioned in a shallow circumferential groove between a flange 13 and a rib 17, the latter constituting an effective barrier to lateral movement of a tire bead into the central well 11 of the rim. Consequently a tire tool such as may be employed for forcing a tire bead over the rib 17 requires to be of rugged construction so as to withstand the strains incidental to operation, and also must be so constructed as to multiply the manual effort applied to the tool whereby the strong force necessary to the unseating of the tire may be provided.

As shown in Figures 1 to 3, the improved tire tool comprises an angular main unit or structure 20, one end portion of which constitutes a handle or hand grip, the other end portion thereof, designated 21, being in offset relation to the hand grip portion and constituting a work-engaging structure or jaw. The work-engaging jaw 21 is transversely flattened and somewhat pointed to chisel shape at its free end whereby it readily may be inserted between a tire bead and a rim flange 13. The work-engaging jaw 21 is substantially parallel to the hand-grip structure 20, and is united with the latter by a flat connecting piece 22 that is disposed substantially at right angles to said portions 20 and 21. The connecting piece 22 is formed with a pair of slots 23 and 24 that extend longitudinally thereof with their adjacent ends in spaced apart relation.

Supported by the connecting piece 22 is a flat, slightly curved, jaw 26 that has a reduced neck portion 27 that extends through said slot 23, and has an enlarged head 28 on the free end of said neck portion to prevent removal of the jaw from said connecting piece. The end of the jaw 26 remote from the head 28 is flattened to chisel shape. The jaw 26 is adapted to be moved laterally from and toward the jaw 21, the jaws being juxtaposed, as shown in Fig. 1, and both inserted between a tire bead and a rim flange 13 at the initial phase of a cycle of operation. Insertion of the jaws 21, 26 into operative position as described may be facilitated by hammering upon the end of the hand-grip portion of the unit, if necessary. Also supported by the connecting piece 22 is a hook element 29 that has a reduced neck 30 at one end, said neck being received within the slot 24. An enlarged head 31 on the end of neck 30 retains the hook member in assembled relation with said connecting piece.

The end of element 29 remote from head 31, on the side thereof that confronts jaw 26, is formed to hook shape and is adapted to engage with the flange 13 of rim 11, as is clearly shown in Figs. 1 and 2. The arrangement is such that by fulcruming the hook 29 upon the flange 13, it is possible to exert strong leverage upon the unit 20 to retain the jaw 21 in contact with the bead seat 12 during the subsequent operation of forcing the tire bead from said seat. The slotted connections between the jaw 26 and hook element 29 and the connecting piece 22 of the main unit 20 are loose so as to enable said jaw and hook elements to swing pivotally, and also to enable a sliding movement of translation of said elements toward or away from the jaw 21 and toward or away from each other.

A second unit of the tire tool consists of a lever 33 that is a flat metal bar or strap having a relatively short end portion 34 bent at right angles to the major portion of its structure. Said end portion 34 is receivable between the jaws 21, 26, when the said jaws are in operative position between a tire bead and the rim flange 13, as shown in Fig. 1. Then by moving the two units of the tire tool angularly of each other, as shown in Fig. 2, the bent portion 34 of the lever 33 is caused to effect a separation or spreading apart of the jaws 21, 26. During this operation the lever portion 34 fulcrums against the jaw 26, and since the latter bears against the immovable rim-flange 13, relative spreading movement of the jaws forces the jaw 21 against the side and bead portion of the tire 14, thereby forcing the tire bead over the rib 17 and into the central well of the rim.

By reason of the leverage employed by the tool unit 33, it is possible to exert a sufficiently powerful spreading force upon the jaws 21, 26 to force the tire bead into the well of the tire rim even through the tire bead may have rusted to the rim. In dismounting large tires, it is frequently necessary to employ leverage upon the jaw 21, through the agency of the hook member 29, to keep the said jaw in contact with the bead seat 12 during the jaw-spreading operation. The tire tool is simple in construction and operation, and achieves the several advantages set out in the foregoing statement of objects.

The embodiment of the invention shown in Fig. 4 of the drawing is essentially similar to that previously described, and differs therefrom only in the power means employed for effecting separation of the work-engaging jaws. Thus the member 20, jaw 21, and connecting piece 22 are identical with the similarly designated elements of the previously described embodiment of the invention, the connecting piece 22 including the two slots 23 and 24. The tool includes a jaw 36 that is substantially identical to the jaw 26 previously described and serves the same function as the latter. Also a hook member 37 is provided, which member is substantially identical to hook member 29 previously described. For effecting separation of the jaws 21, 36 to move a tire-bead off its seat, a crank 38 is provided, which crank has an end portion formed with screw threads 39. The latter are threaded through the jaw 36, the arrangement being such that the threaded end of the crank will engage the jaw 21. The hook member 37 is slotted at 40 to enable the threaded portion of the crank 38 to extend therethrough. It will be apparent that by means of the crank 38 the jaws 21, 36 may be spread apart with a powerful force sufficient to displace the tire bead from its seat on the rim.

Other modification may be resorted to provided it comes within the scope of the claims.

What is claimed is:

1. A tire tool comprising a reversely curved structure of which one end portion constitutes a hand-grip and the other end portion is formed as a jaw, there being a connecting piece intermediate said hand-grip and jaw, which piece is formed with a pair of longitudinally extending slots with adjacent ends in spaced apart relation, a second jaw disposed beside the first jaw and formed at one end with a reduced neck that is slidably received in the slot nearest the first mentioned jaw, a hook member formed at one end with a reduced neck receivable in the other of said slots, said hook member being engageable with a rim flange to assist in retaining the pair of jaws between a tire bead and a rim flange, and means for urging said jaws apart from each other.

2. A tire tool comprising a reversely curved structure of which one end portion constitutes a hand grip and the other end portion is formed as a jaw, there being a connecting piece intermediate said hand-grip and jaw, which piece is formed with a pair of longitudinally extending slots in longitudinally spaced apart relation, a second jaw positioned beside the first and formed at one end with a reduced neck that is slidably received in the slot nearest the first mentioned jaw, a hook member formed at one end with a reduced neck received in the other of said slots, said hook member being engageable with a rim flange to assist in retaining the pair of jaws between a tire bead and a rim flange, and a flat, angular, manually operable lever having a portion insertable between the jaws and adapted to separate the same as the lever is turned angularly.

3. A tire tool comprising a reversely curved structure of which one end portion constitutes a hand grip and the other end portion is formed as a jaw, there being a connecting piece intermediate said hand-grip and jaw, which piece is formed with a pair of longitudinally extending slots in longitudinally spaced apart relation, a second jaw positioned beside the first and formed at one end with a reduced neck that is slidably received in the slot nearest the first mentioned jaw, a hook member formed at one end with a reduced neck received in the other of said slots, said hook member being engageable with a rim flange to assist in retaining the pair of jaws between a tire bead and a rim flange, and means for separating said jaws, which means consists of a crank that is threaded through one jaw and is in engagement with the other jaw, and which extends freely through an aperture in the hook member.

HAROLD J. LEIDEL.